United States Patent
Soriente et al.

(10) Patent No.: US 12,335,404 B2
(45) Date of Patent: Jun. 17, 2025

(54) METHOD AND COMPUTATION ENTITY FOR PERFORMING COMPUTATION OF A FUNCTION OVER ENCRYPTED DATA

(71) Applicant: NEC Laboratories Europe GmbH, Heidelberg (DE)

(72) Inventors: Claudio Soriente, Heidelberg (DE); Dario Fiore, Madrid (ES)

(73) Assignee: NEC CORPORATION, Tokyo (JP)

( * ) Notice: Subject to any disclaimer, the term of this patent is extended or adjusted under 35 U.S.C. 154(b) by 197 days.

(21) Appl. No.: 18/020,272

(22) PCT Filed: Feb. 17, 2021

(86) PCT No.: PCT/EP2021/053913
§ 371 (c)(1),
(2) Date: Feb. 8, 2023

(87) PCT Pub. No.: WO2022/053182
PCT Pub. Date: Mar. 17, 2022

(65) Prior Publication Data
US 2023/0269089 A1    Aug. 24, 2023

(30) Foreign Application Priority Data

Sep. 9, 2020   (EP) .................................. 20195198

(51) Int. Cl.
*H04L 29/06* (2006.01)
*H04L 9/00* (2022.01)
*H04L 9/32* (2006.01)

(52) U.S. Cl.
CPC ............ *H04L 9/3242* (2013.01); *H04L 9/008* (2013.01)

(58) Field of Classification Search
CPC ......... H04L 9/008; H04L 9/3242; Y04S 40/20
See application file for complete search history.

(56) References Cited

U.S. PATENT DOCUMENTS

| 9,641,332 | B1* | 5/2017 | Yung | ......................... H04L 9/30 |
| 10,630,478 | B1* | 4/2020 | Yavuz | ..................... H04L 9/321 |
| 2014/0310524 | A1* | 10/2014 | Yamanaka | ............ H04L 63/123 |
| | | | | 713/170 |

(Continued)

FOREIGN PATENT DOCUMENTS

| CN | 104601586 A | 5/2015 | |
| CN | 111294366 A | * 6/2020 | ............. G06Q 50/06 |

OTHER PUBLICATIONS

Catalano, Dario et al.; "Boosting Linearly-Homomorphic Encryption to Evaluate Degree-2 Functions on Encrypted Data"; *Proceedings of the 22nd ACM SIGSAC Conference on Computer and Communications Security*; Oct. 12, 2015; pp. 1518-1529; ACM Publications; New York, NY, USA.

(Continued)

*Primary Examiner* — Tri M Tran
(74) *Attorney, Agent, or Firm* — Leydig, Voit & Mayer, Ltd.

(57) ABSTRACT

A method for performing computation of a function over encrypted data by a computation entity is provided. According to the method, the computation of a quadratic function is performed by the computation entity, the encrypted data are encrypted by a linearly homomorphic encryption scheme, and a homomorphic message authentication code is used for providing verifiable computation on encrypted data.

14 Claims, 1 Drawing Sheet

$Enc(ek, id, m_1, ..., m_n) \rightarrow epk_{id}, vk_{id}, \sigma_1, ..., \sigma_n$ $epk_{id}, \sigma_1, ..., \sigma_n \rightarrow$ $vk_{id} \rightarrow$ $f \leftarrow$ $Eval(epk_{id}, f, \sigma_1, ..., \sigma_n) \rightarrow \sigma$ $\sigma \rightarrow$ $Dec(dk, vk_{id}, f, \sigma) \rightarrow$
$f(m_1, ..., m_n) / \bot$

(56) References Cited

U.S. PATENT DOCUMENTS

2015/0215123 A1\* 7/2015 Kipnis ..................... H04L 9/08
                                                              380/46
2015/0288662 A1  10/2015 Bilogrevic et al.
2019/0386814 A1\* 12/2019 Ahmed .................. H04L 9/008

OTHER PUBLICATIONS

Fiore, Dario et al.; "Efficiently Verifiable Computation on Encrypted Data"; *Proceedings of the 2014 ACM SIGSAC Conference on Computer and Communications Security*; Nov. 3, 2014; pp. 1-44; ACM Publications; New York, NY, USA.

\* cited by examiner

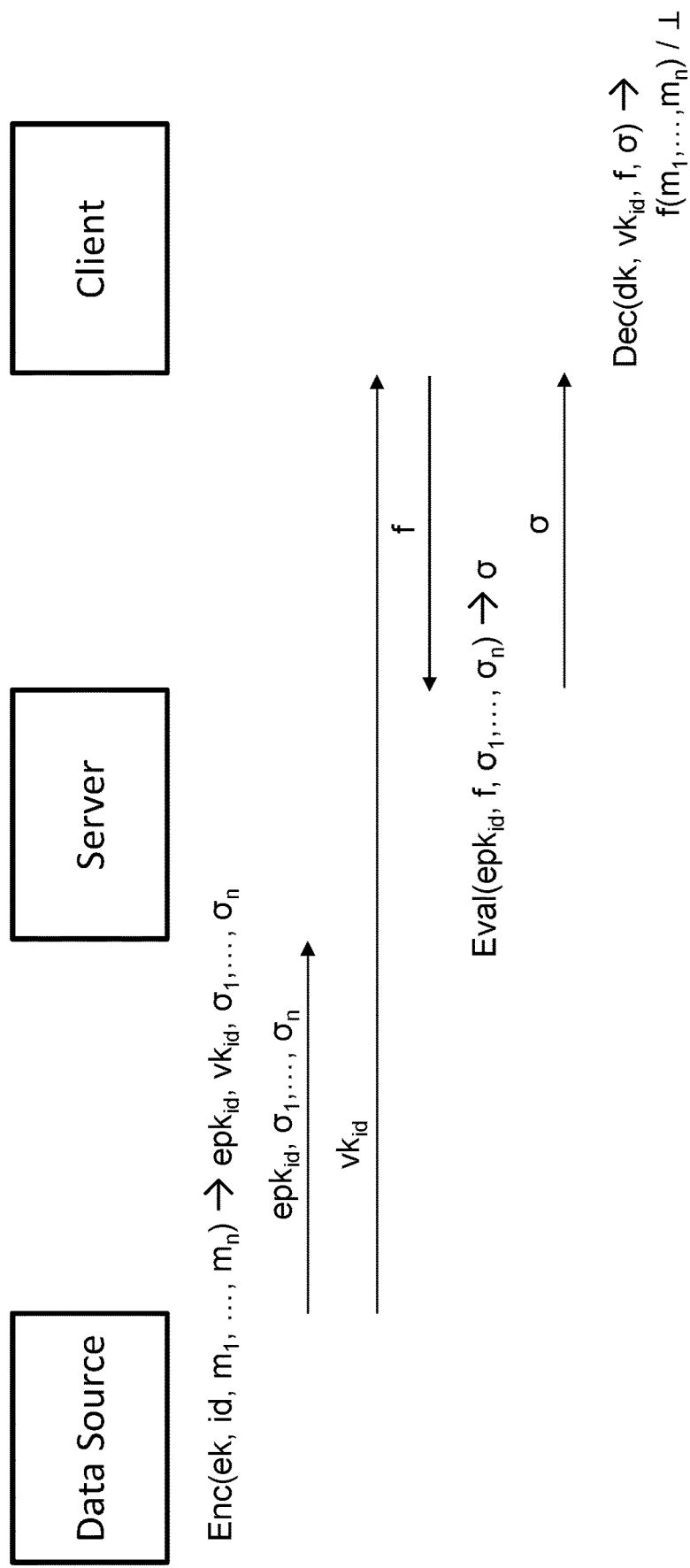

METHOD AND COMPUTATION ENTITY FOR PERFORMING COMPUTATION OF A FUNCTION OVER ENCRYPTED DATA

This application is a U.S. National Phase application under 35 U.S.C. § 371 of International Application No. PCT/EP2021/053913, filed on Feb. 17, 2021, and claims benefit to European Patent Application No. EP 20195198.5, filed on Sep. 9, 2020. The International Application was published in English on Mar. 17, 2022 as WO 2022/053182 A1 under PCT Article 21(2).

FIELD

The present invention relates to a method for performing computation of a function over encrypted data by a computation entity and to a corresponding computation entity.

BACKGROUND

Methods and systems for performing computation of a function over encrypted data by a computation entity are known from prior art.

Corresponding prior art documents are listed as follows:
[1] Dario Catalano and Dario Fiore. Using linearly-homomorphic encryption to evaluate degree-2 functions on encrypted data. ACM CCS 2015
[2] Dario Fiore, Rosario Gennaro, and Valerio Pastro. Efficiently verifiable computation on encrypted data. ACM CCS 2014
[3] https://en.wikipedia.org/wiki/Baby-step_giant-step Homomorphic encryption warrants computation over encrypted data, thereby enabling data-mining as a service application where the server—i.e., the entity carrying out the computation—is not trusted to see data in cleartext. In a typical application scenario, data-sources encrypt their data and upload it to a server or computation entity. Clients—who may or may not be data-sources—ask the server or computation entity to compute one or more specific functions over the encrypted data or ciphertexts and obtain the result. All operations are such that the server or computation entity learns nothing about cleartext data nor it learns the outcome of the computations it carries out on behalf of clients. Similarly, clients learn nothing on cleartext data, beyond the outcome of the computations they request—unless they provided such data acting as data-sources.

The above blueprint provides data privacy but does not cater for integrity of the computations carried out by the server or computation entity. The problem is that the client has no means to tell if the computation result, as provided by the server or computation entity is correct, whereas a malicious server or computation entity may provide an arbitrary result.

SUMMARY

In an embodiment, the present disclosure provides a method for performing computation of a function over encrypted data by a computation entity, the method including performing computation of a quadratic function by the computation entity, and encrypting the encrypted data by a linearly homomorphic encryption scheme, wherein a homomorphic message authentication code is used for providing verifiable computation on encrypted data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows in a diagram a system model according to an embodiment of the invention comprising a computation entity.

DETAILED DESCRIPTION

In an embodiment, the present invention improves and further develops a method for performing computation of a function over encrypted data by computation entity and a corresponding computation entity so that a reliable computation result is obtainable by simple means.

In accordance with another embodiment of the invention, the present invention provides a method for performing computation of a function over encrypted data by a computation entity, wherein the computation of a quadratic function is performed by the computation entity, wherein the encrypted data are encrypted by means of a linearly homomorphic encryption scheme, and wherein a homomorphic message authentication code is used for providing verifiable computation on encrypted data.

Further, in accordance with another embodiment of the invention, the present invention provides a computation entity for performing computation of a function over encrypted data, preferably for carrying out the above method, wherein the computation of a quadratic function is performed by the computation entity, wherein the encrypted data are encrypted by means of a linearly homomorphic encryption scheme, and wherein a homomorphic message authentication code is used for providing verifiable computation on encrypted data.

According to an embodiment of the invention it has first been recognized that it is possible to obtain a very a reliable computation result by simple means on the basis of simply a smart modification of a prior method. It has been further recognized that concretely the use of a homomorphic message authentication code can provide verifiable computation on encrypted data. Such a modification is effective. A corresponding computation entity is provided for performing computation of the function over the encrypted data. The above problem is solved by enabling any client to verify the computation carried out by the computation entity. In order to do so, embodiments of the current invention build on techniques to compute quadratic functions from data encrypted with a linearly-homomorphic encryption scheme and homomorphic message authentication codes, to provide verifiable computation on encrypted data.

Thus, an efficient method and computation entity for obtaining a reliable computation result by simple means are provided.

According to an embodiment of the invention the homomorphic message authentication code can be used to define a verifiable computation scheme. This homomorphic message authentication code can enable the computation of quadratic functions over ciphertexts. The defined verifiable computation scheme can enable the computation of quadratic functions given ciphertext encrypted via a linearly homomorphic encryption scheme.

According to a further embodiment the linearly homomorphic encryption scheme can be a linearly homomorphic ElGamal encryption scheme, particularly with ElGamal in the exponent. This will provide a very reliable computation result.

Within a further embodiment—for example during performing the computation over the encrypted data—a computation over authentication tags that accompany the encrypted data can be performed, so that preferably the computation entity can output an encoding that includes a ciphertext encrypting the result of the computation and a tag. On the basis of such an embodiment augmenting the computation over ciphertexts carried out by a computation entity or server in an application scenario where the computation entity or server runs computation over encrypted data can easily be performed, with the same computation over authentication tags that accompany such ciphertexts, so that the server outputs an encoding that includes the ciphertext encrypting the result of the computation and a tag.

According to a further embodiment an integrity of the result is verified by means of a final tag. There can be used the final tag as received by the computation entity or server. This verifying step can easily be performed by any client.

According to a further embodiment a data source can encode or encrypt one or more data items by means of the linearly homomorphic encryption scheme thereby producing one or more encodings, a public evaluation key and/or a private verification key. According to a further concrete embodiment the linearly homomorphic encryption scheme can produce one or more encodings, a public evaluation key and/or a private verification key. As a result a reliable computation result is obtainable by simple means.

Within a further embodiment a degree-2 function of the encrypted or encoded data can be computed by the computation entity by means of homomorphic operations over the encryptions or encodings, thereby producing an output encoding.

According to a further embodiment it can be verified that the output encoding encodes the result of the function over the encrypted or encoded data and, if so, the output encoding can be decoded. Such a verifying step can be performed by any client.

Within a further embodiment the method can be used in data-mining, for example as a service application, and/or in machine learning, for example as a service application. Within further use cases the current invention can have direct applicability in machine learning as a service application. For example, in the context of health-data applications, data-sources could be patients uploading encrypted data, clients could be hospitals interested in mining such data, and the server could be the national health authority. The current invention could also be applied in the context of smart cities. For example, data sources could be smart energy meters installed into households, the server could be an energy authority, and a client could be an energy company interested in obtaining insights on citizen's energy usage.

According to a further embodiment a data source provides and/or encrypts the data.

Within further embodiments the data source transmits and/or uploads the encrypted data to the computation entity.

As already mentioned above the data source can be a metering device or a smart energy meter for use in any possible application and not only within households.

According to a further embodiment the encrypted data can be provided in the form of a ciphertext or ciphertexts depending on the individual embodiment and use case.

Within a further embodiment the computation entity can be a server or cloud server.

Advantages and aspects of embodiments of the present invention are summarized as follows:

Embodiments enable verifiable computation in data-mining as a service application where, for example, a cloud provider computes, on behalf of clients, quadratic functions over data encrypted by means of a linearly homomorphic encryption scheme. Previous approaches guarantee data privacy by ensuring that the server has no access to cleartext data but only computes over ciphertexts. Previous approaches, however, do not guarantee integrity of the computation. That is, the server may provide any result that is treated as correct by the client. Embodiments of the current invention allow the client to check that the server has carried out the computation correctly. As a result, the embodiments of the current invention refine the trust model of data-mining as a service application because the computation entity or server is not trusted to see data in the clear—as in previous approaches—nor it is trusted to carry out the computation correctly. Embodiments of the current invention have direct application in data-mining scenarios like FIWARE-based IoT platforms or machine-learning as a service application where clients outsource the prediction algorithm to the cloud.

Embodiments of the current invention solve the prior art problems by enabling clients to verify the computation carried out by the computation entity or server. In order to do so, embodiments of the current invention build on techniques to compute quadratic functions from data encrypted with a linearly-homomorphic encryption scheme and homomorphic message authentication codes, to provide verifiable computation on encrypted data. Embodiments provide a development of a homomorphic message authentication code that enables the computation of quadratic functions over ciphertexts like the ones described in [1] and use it to define a verifiable computation scheme that enables the computation of quadratic functions given ciphertext encrypted via a linearly-homomorphic encryption scheme.

Further advantages and aspects of embodiments of the present invention are summarized as follows:

Embodiments augment the computation over ciphertexts carried out by a computation entity or server in an application scenario where the computation entity or server runs computation over encrypted data, with the same computation over authentication tags that accompany such ciphertexts, so that the computation entity or server can output an encoding that includes the ciphertext encrypting the result of the computation and a tag.

Verifying, by a client, the integrity of the computation result by means of the final tag as received by the computation entity or server can be provided by embodiments.

Designing a homomorphic message authentication code that enables the verification of quadratic functions computed over messages encrypted using the linearly-homomorphic ElGamal encryption scheme can be provided by further embodiments.

According to a further embodiment a method for verifiable computation of quadratic functions over encrypted data by a computation entity or server can be provided, comprising the steps of 1) Encoding, by a data source, one or more data items, by means of the linearly-homomorphic ElGamal encryption scheme, thereby producing one or more encodings, a public evaluation key and a private verification key.
2) Computing by a server a degree-2 function f of the data encoded at the previous step, by means of homomorphic operations over the encodings, thereby producing an output encoding.

3) Verifying, by a client that the output encoding of the previous step encodes the result of evaluating function f over data encoded at step 1 and, if so, decoding the output encoding of the previous step.

Embodiments of the invention can add verifiability to applications that outsource computation of quadratic function over data encrypted by means of linearly-homomorphic encryption. Embodiments of the invention can be used to verify responses from the computation entity or server in outsourced data-mining applications, e.g., FIWARE based platforms or machine-learning as a service application.

There are several ways how to design and further develop the teaching of the present invention in an advantageous way. To this end it is to be referred to the following explanation of examples of embodiments of the invention, illustrated by the drawing.

EMBODIMENTS OF THE INVENTION

Linearly-Homomorphic ElGamal

Let G denote a group of order p where the Decisional Diffie-Hellman assumption holds. Algorithm ElG.KeyGen picks two random generators u,g of G, a random $x \sqsubset Z_p$ and outputs (pk=(g,u,h=$u^x$),sk=x). Given a public key pk and a message $m \sqsubset Z_p$, the encryption routine ElG.Enc picks a random $r \square Z_q$ and outputs (a=$g^m h^r$, $u^r$). Finally, given a ciphertext (a,b) and secret key sk, the decryption routine ElG.Dec first computes y=a($b^{sk})^{-1}$ and then outputs the discrete logarithm of y in base g (e.g., by using the giant-step baby-step algorithm [3]).

This encryption scheme is linearly homomorphic. In particular let ciphertexts ($a_1$, $b_1$) and ($a_2$, $b_2$) be encryption of $m_1$, $m_2$ under the same public key, respectively. One can compute ($a_1$, $b_1$)⊞($a_2$, $b_2$)=($a_1 a_2$, $b_1 b_2$); its decryption provides $m_1+m_2$. Similarly, given a constant $c \sqsubset Z_p$ and ciphertext (a,b) encrypting message m, one can compute c⊕(a,b)=($g^c$ a,b); its decryption provides c+m. Finally, given constant $c \sqsubset Z_p$ and ciphertext (a,b), one can compute c⊗(a,b)=($a^c,b^c$); its decryption provides cm.

Correctness is straightforward whereas the scheme is semantic secure if the Decisional Diffie-Hellmann assumption holds in G.

Homomorphic Computations of Quadratic Functions Over Linearly-Homomorphic Ciphertexts The authors of [1] show how to homomorphically compute a degree-2 function f over a set of ciphertexts $c_1, \ldots, c_n$, where $c_i$ is produced by encrypting message $m_i$ with the linearly-homomorphic ElGamal encryption scheme. In particular, the authors of [1] define a ciphertext of message m as c=(a,b) where a=m−r and b=ElG.Enc (r), for a random r. The authors of [1] also define a procedure Evalf( ) that given a degree-2 function f and n ciphertexts $c_1, \ldots, c_n$, produces a ciphertext c=Enc(f($m_1, \ldots m_n$)−f($r_1, \ldots r_n$)) by means of homomorphic computations over $c_1, \ldots, c_n$.

System or Computation Entity Model

The system or computation entity model is depicted in FIG. 1. Prior to operations, we assume a key-generation routine run by the client that defines message and ciphertext spaces, as well as, an encoding key ek and a decoding key dk. The encoding key can be distributed e.g., to data-sources, whereas the decoding key is kept secret. Data sources use the encoding routine Enc to encode data $m_1, \ldots, m_n$ using encoding key ek and an arbitrary label id; the routine outputs encodings $\sigma_1, \ldots, \sigma_n$, a private verification key $vk_{id}$ and an evaluation public key $epk_{id}$. Encodings and evaluation public key are uploaded to the server, whereas the verification key is sent to the client.

A client can ask the server to compute a specific function f over encodings uploaded by data-sources. We assume f to be quadratic, e.g., f(x)=$ax^2$+bx+c. The server runs algorithm Eval that produces an output encoding σ; the latter is sent to the client. Finally, the client executes the decoding algorithm Dec with input the decoding key dk, a verification key $vk_{id}$ and the output encoding σ as received by the server, to recover either f($m_1, \ldots, m_n$) or an error message ⊥.

Note that the client can act as a data-source. Further, the label used during Enc enables a limited form of access control as only encodings produced with the same id can be used together to compute a specific function.

Instantiation

KeyGen(λ): The key-generation algorithm defines system parameters to be used as implicit input to all the other algorithms as well as the encoding and decoding keys. Parameters include:

the description of bilinear groups G, G', $G_T$ of prime order p, equipped with a bilinear map e: G×G'→$G_T$ a random generator of G' denoted as $g_2$ the description of message space M=$Z_p$, and ciphertext space C=$G^2$ for linearly-homomorphic ElGamal as described above the description of two pseudo-random functions: $PRF^a$ that maps arbitrary strings to M, and $PRF^b$ that maps arbitrary strings to C Keys are generated by running (pk=(g, u, h), sk=x)←ElG.KeyGen(λ) and setting ek=pk and dk=sk.

Enc(ek, id, $m_1, \ldots, m_n$):

Parse ek as pk

Sample at random t from M, as well as seeds $K_a$, $K_b$ for the two PRFs.

Compute a fresh encryption of zero $Z_2$=($u^z,h^z$)←ElG.Enc(pk,0), and an authenticator of it $Z_0$=$u^{zt'}$, $h^{zt2}$)←$Z_2 \sqsubset t^2$.

For $i \sqsubset [n]$:

Sample a random $r_i$ from $Z_p$ and set $a_i$=$m_i-r_i$, $b_i$=ElG.Enc(pk,$r_i$).

Compute the following values:

$y_{i,0}$=$PRF^a_{Ka}$(id, i)−$a_i$·t, $y_{i,1}$=$a_i$, $Y_{i,0}$=$PRF^b_{Kb}$(id, i)$\sqsubset b_i \sqsubset$ −t), $Y_{i,1}$=$b_i$, Set $\sigma_i$=($y_{i,0}$, $y_{i,1}$, $Y_{i,0}$, $Y_{i,1}$).

Set $vk_{id}$=(t, $K_a$, $K_b$, r=$r_1, \ldots, r_n$) and $epk_{id}$=($Z_0,Z_2$)

Eval($epk_{id}$, f, $\sigma_1, \ldots, \sigma_n$):

For $i \sqsubset [n]$, parse $\sigma_i$=($y_{i,0}$, $y_{i,1}$, $Y_{i,0}$, $Y_{i,1}$) and treat ($y_{i,0}$, $y_{i,1}$) (resp. $Y_{i,0}$, $Y_{i,1}$) as coefficients of a degree-1 polynomial $y_i(X) \sqsubset M[X]$ (resp. $Y_i(X) \sqsubset C[X]$). The evaluation algorithm computes an output encoding σ=($Y\hat{}_0$, $Y_2$) as follows.

First, evaluate f homomorphically on the encodings by using the following primitive operations.

Eval.add($epk_{id}$, $\sigma_1$, $\sigma_2$). Given as input a public evaluation key and two encodings, the steps of this operation depend on the degrees of the encodings.

If both encodings are of degree 1:

Parse $\sigma_1$ as (($y_{1,0},y_{1,1}$), ($Y_{1,0},Y_{1,1}$)), and $\sigma_2$ as (($y_{2,0},y_{2,1}$), ($Y_{2,0},Y_{2,1}$))

Compute σ=(($y_{1,0}+y_{2,0},y_{1,1}+y_{2,1}$), ($Y_{1,0} \sqsubset Y_{2,0}$, $Y_{1,1} \sqsubset Y_{2,1}$))

If both encodings are of degree 2

Parse $\sigma_1$=($Y_{1,0}$, $Y_{1,1}$, $Y_{1,2}$), $\sigma_2$=($Y_{2,0}$, $Y_{2,1}$, $Y_{2,2}$)

Compute σ=($Y_{1,0} \sqsubset Y_{2,0}$, $Y_{1,1} \sqsubset Y_{2,1,0}$, $Y_{1,2} \sqsubset Y_{2,2}$)

Eval.add−const($epk_{id}$, c, σ): on input a public evaluation key, an element $c \sqsubset M$ and an encoding σ, proceed as follows:

If $\sigma=((y_0,y_1), (Y_0,Y_1))$, outputs $\sigma^0=((y_0,y_1), (Y_0,Y_1\boxdot c))$.

If $\sigma=(Y_0, Y_1, Y_2)$, outputs $\sigma^0=\sigma$

Eval.mul-const($epk_{id}$, c, $\sigma$): on input a public evaluation key, an element $c \in M$ and an encoding $\sigma$, proceed as follows:

If $\sigma=((y_0,y_1), (Y_0,Y_1))$, output $\sigma^0=((y_0 \cdot c, y_1 \cdot c), (Y_0 \boxdot c, Y_1 \boxdot c))$.

If $\sigma=(Y_0, Y_1, Y_2)$, output $\sigma^0=(Y_0 \boxdot c, Y_1 \boxdot c, Y_2 \boxdot c)$.

Eval.mul($epk_{id}$, $\sigma_1$, $\sigma_2$): on input the public key and two encodings $\sigma_1$, $\sigma_2$ of degree 1, outputs an encoding $\sigma$ of degree 2 obtained as follows:

$Y_0=(y_{1,0} \cdot y_{2,0}) \boxdot Y_{1,0} \boxdot y_{2,0} \boxdot Y_{2,0} \boxdot y_{1,0}$ $Y_1=(y_{1,0} \cdot y_{2,1}+y_{2,0} \cdot y_{1,1}) \boxdot (Y_{1,0} \boxdot y_{2,1} \boxdot Y_{1,1} \boxdot y_{2,0}) \boxdot (Y_{2,0} \boxdot y_{1,1} \boxdot Y_{2,1} \boxdot y_{1,0})$ $Y_2=(y_{1,1} \cdot y_{2,1}) \boxdot Y_{1,1} \boxdot y_{2,1} \boxdot Y_{2,1} \boxdot y_{1,1}$ Once the homomorphic evaluation off is complete, given $Y_0$, $Y_1$, $Y_2$ proceed as follows:

Sample a random s from M

Compute $Y_0=e(Y_0,g_2) \cdot e(Y_1, g_2^r) \cdot e(Z_2 - (-s), g_2)$

Compute $Y_2=Y_2' \cdot Z_2 - s$

Set output encoding to $\sigma=(Y_0,Y_2)$

Dec(dk, $vk_{id}$, f, id, $\sigma$):

Parse dk as sk and $vk_{id}$ as (t, $K_a$, $K_b$, $r=r_1, \ldots, r_n$). Let $\sigma=(Y_0,Y_2) \in G_T^2 \times C$.

Compute $\rho=(\rho_1, \ldots, \rho_n)$ and $S=(S_1, \ldots, S_n)$, where $\rho_i=PRF^a_{Ka}(id,i)$ and $S_i=PRF^b_{Kb}(id,i)$ Compute z=f(r)

Compute w=Evalf($\rho$, S)

If $Y_0 \cdot e(Y_2, g_2^r)$ is equal to $e(w, g_2)$, then output the discrete logarithm in base g of ElG.Dec(sk,$Y_2 \cdot g^z$); otherwise output "error"

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for performing verifiable computation of a quadratic function over encrypted data by a computation entity, the method comprising:
generating the encrypted data or receiving the encrypted data from a data source, wherein the encrypted data is encrypted by a linearly homomorphic encryption scheme, and
performing the computation of the quadratic function over the encrypted data by the computation entity,
wherein a homomorphic message authentication code is used for providing the verifiable computation on the encrypted data,
wherein a computation over authentication tags that accompany the encrypted data is performed, so that the computation entity can output an encoding that includes a ciphertext encrypting a result of the computation and a tag, and
wherein an integrity of the result is verified by a final tag, and
wherein the tags are different from the homomorphic message authentication code.

2. The method according to claim 1, wherein the homomorphic message authentication code is used to define a verifiable computation scheme.

3. The method according to claim 1, wherein the linearly homomorphic encryption scheme is a linearly homomorphic ElGamal encryption scheme.

4. The method according to claim 1, wherein the linearly homomorphic encryption scheme produces one or more encodings, a public evaluation key and/or a private verification key.

5. The method according to claim 4, wherein a degree-2 function of the encrypted or encoded data is computed by the computation entity by homomorphic operations over the encryptions or encodings, thereby producing an output encoding.

6. The method according to claim 5, wherein it is verified that the output encoding encodes the result of the function over the encrypted or encoded data and, if so, the output encoding is decoded.

7. The method according to claim 1, wherein the method is used in data-mining and/or in machine learning.

8. The method according to claim 1, wherein the data source provides and/or encrypts the data.

9. The method according to claim 8, wherein the data source transmits and/or uploads the encrypted data to the computation entity.

10. The method according to claim 8, wherein the data source is a metering device or a smart energy meter.

11. The method according to claim 1, wherein the encrypted data are provided in the form of a ciphertext or ciphertexts.

12. The method according to claim 1, wherein the computation entity is a server or cloud server.

13. A system for performing verifiable computation of a quadratic function over encrypted data, the system comprising:

one or more hardware processors configured to:
generate the encrypted data or receive the encrypted data from a data source, wherein the encrypted data is encrypted by a linearly homomorphic encryption scheme, and
perform the computation of the quadratic function, and
wherein a homomorphic message authentication code is used for providing the verifiable computation on the encrypted data,
wherein a computation over authentication tags that accompany the encrypted data is performed, so that the computation entity can output an encoding that includes a ciphertext encrypting a result of the computation and a tag,
wherein an integrity of the result is verified by a final tag, and
wherein the tags are different from the homomorphic message authentication code.

14. The method according to claim 6, wherein the data source encrypts the encrypted data by the linearly homomorphic encryption scheme and a client performs the verification that the output encoding encodes the result of the function over the encrypted or encoded data.

* * * * *